United States Patent [19]

Kendall et al.

[11] Patent Number: 4,492,185
[45] Date of Patent: Jan. 8, 1985

[54] HIGH EFFICIENCY, REDUCED EMISSIONS WATER HEATER

[75] Inventors: Robert M. Kendall, Sunnyvale; Richard J. Schreiber, Mountain View; John P. Kesselring, Mt. View, all of Calif.

[73] Assignee: Alzeta Corporation, Mt. View, Calif.

[21] Appl. No.: 572,602

[22] Filed: Jan. 20, 1984

Related U.S. Application Data

[63] Continuation of Ser. No. 308,374, Oct. 5, 1981, abandoned.

[51] Int. Cl.³ .............................................. F22B 1/02
[52] U.S. Cl. .................................. 122/32; 122/14; 122/17; 122/161; 126/350 R; 126/361; 431/326
[58] Field of Search ................ 122/20 A, 20 B, 14, 122/13 R, 16, 17, 33, 32, 161; 126/390 R, 361; 431/326

[56] References Cited

U.S. PATENT DOCUMENTS

| | | | |
|---|---|---|---|
| 2,094,908 | 10/1937 | Thrall | 122/14 |
| 3,236,211 | 2/1966 | Okaniwa | 122/33 |
| 3,732,848 | 5/1973 | Bolin | 122/14 |
| 3,832,122 | 8/1974 | LaHaye et al. | 431/326 |
| 4,116,167 | 9/1978 | Hamilton | 122/33 |
| 4,222,350 | 9/1980 | Pompei et al. | 122/33 |

Primary Examiner—Edward G. Favors
Assistant Examiner—Steven E. Warner
Attorney, Agent, or Firm—Flehr, Hohbach, Test, Albritton & Herbert

[57] ABSTRACT

Water heaters are provided which exhibit improved efficiency and emissions performance over conventional water heaters, comprising condensing heat exchanger means and infrared fiber matrix burner means to achieve said improved performance.

3 Claims, 4 Drawing Figures

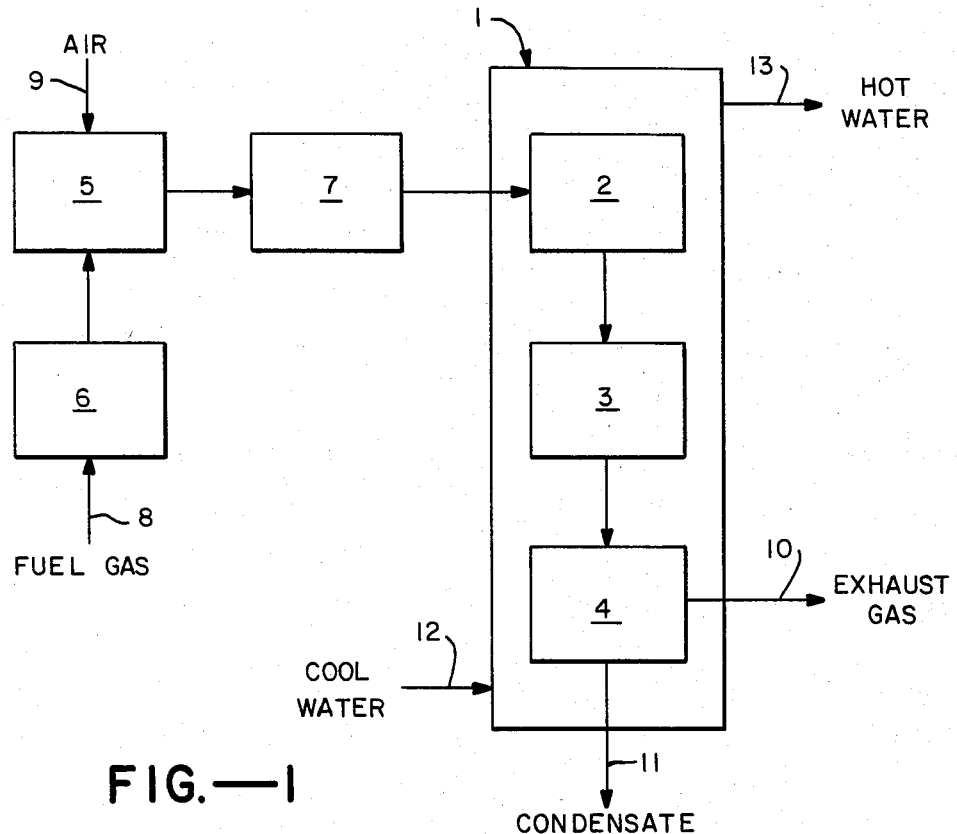
FIG.—1
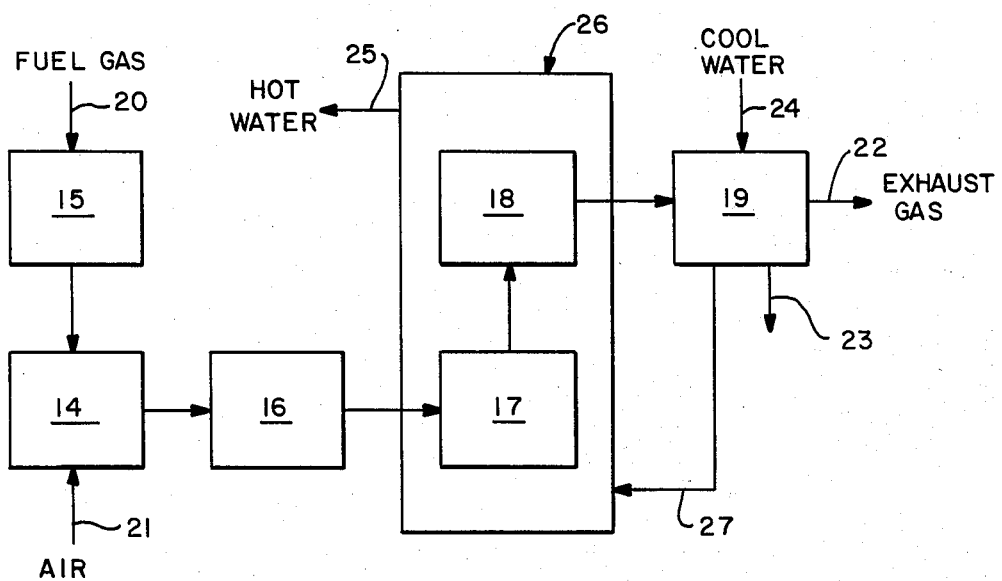
FIG.—2

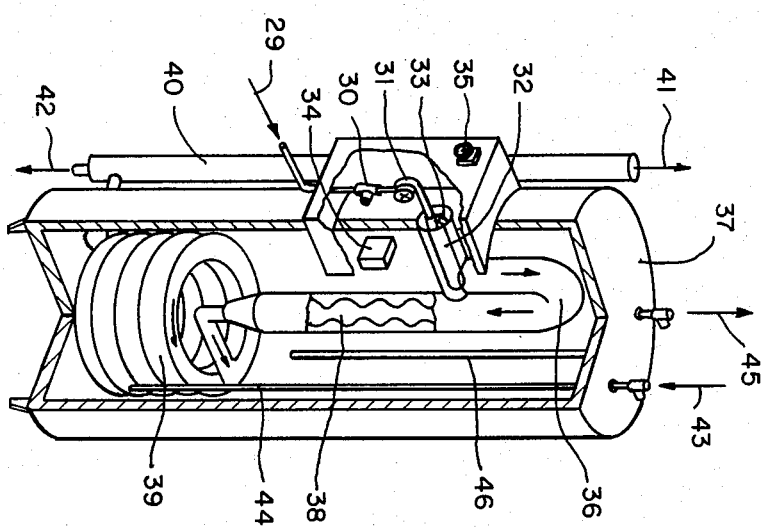
FIG.—3
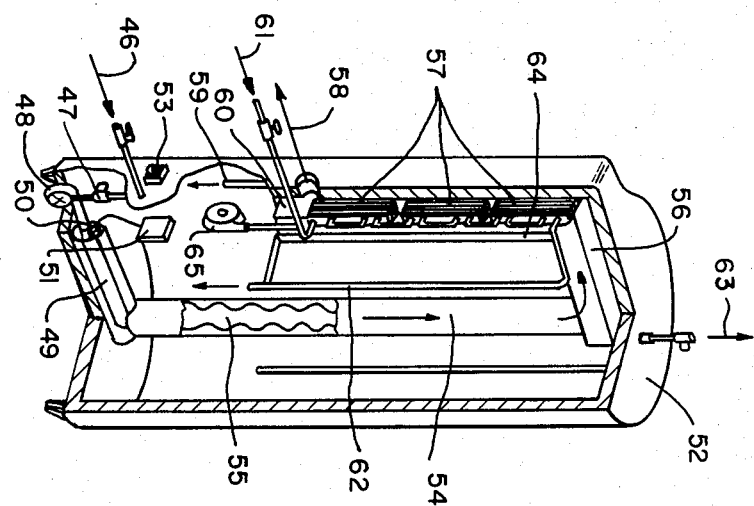
FIG.—4

HIGH EFFICIENCY, REDUCED EMISSIONS WATER HEATER

This application is a continuation of application Ser. No. 308,374, filed Oct. 5, 1981, now abandoned.

The present invention relates to a high efficiency, reduced air pollution emissions storage-type water heater having utility for residential and commercial applications. The performance of the novel water heater according to the present invention is considerably improved over that of conventional water heaters in that the thermal efficiency of the water heater according to the invention may be as high as 95% as compared to conventional storage-type water heaters which may attain thermal efficiency of about 60%. The enhanced thermal efficiency of the water heater according to the present invention therefore results in a corresponding reduction in fuel consumption. Additionally, the water heater of the present invention includes an infrared fiber matrix burner which is fired on gaseous fuels, and which produces emissions of oxides of nitrogen ($NO_x$) at levels of only about 15 ppm, which is approximately 80% lower than the $NO_x$ emissions from a conventional storage-type water heater fired on gaseous fuels. Such a burner is disclosed in U.S. Pat. No. 3,179,156 and in our commonly assigned Ser. No. 177,368, filed Aug. 11, 1980, the disclosures of which incorporated herein by reference. It is, therefore, an object of the invention to provide a storage-type water heater having enhanced and improved thermal efficiency and which when fired on gaseous fuels demonstrates an emissions performance which is particularly advantageous in view of present and anticipated future stringent emissions regulations.

The water heater according to the present invention comprises a water storage chamber, infrared fiber matrix burner heating means, heat exchanging means within said chamber for exchanging heat from said heating means to water contained in said chamber, condensing heat exchanging means whereby moisture from exit flue gas from said heating means is condensed by the cooling action of water entering said chamber at ambient or lower than ambient temperature and contacting said condensing heat exchanging means. Accordingly, a water heater is provided wherein the steady state recovery thermal efficiency for said heating means and said heat exchangers to the water within said chamber is about 90-95% and the concentration of the $NO_x$ emission in the flue gas exiting said condensing heat exchanging means is less than about 15 ppm.

FIG. 1 is a diagram of one embodiment of the invention whereby stratified zones of heating are located within the water storage chamber.

FIG. 2 is an embodiment of the present invention wherein the condensing heat exchanging means is positioned exterior to the water storage chamber.

FIG. 3 is a perspective of a preferred stratified water heater according to the invention.

FIG. 4 is a perspective of a preferred water heater having a condensing heat exchanging means exterior to the water storage chamber.

Referring to FIG. 1, there is described a diagram of one embodiment of a water heater according to the present invention wherein stratified heating zones are maintained within the water storage chamber. There is shown water storage tank 1 with combustion heating means 2, heat exchanging means 3 and condensing heat exchanging means 4 contained therein.

The storage chamber 1 may be constructed of standard, insulated, porcelain-lined materials such as are known in conventional water heaters. Alternatively, storage tank 1 may be constructed of durable plastic liner material, in which case anodic protection of said chamber would not be required. Typically, for residential applications the storage chamber may have a total water capacity of approximately 40 gallons. The combustion heating means 2 may be a conventional combustion heater fired on gaseous fuels. The heating means 2 also may be an infrared fiber matrix burner, such as that described in the U.S. Pat. No. 3,179,156, the disclosure of which is incorporated by reference herein. Air and gaseous fuel may be conducted into the combustion chamber of heating means 2 in any conventional manner. In a preferred embodiment air and gaseous fuel are premixed in air fuel mixer 5 and the fuel gas feedline is preferably controlled by a conventional safety shutoff valve means 6. The infrared fiber matrix burner according to U.S. Pat. No. 3,179,156 used herein will be set at 10% excess combustion air in order to suppress carbon monoxide emissions. Under these conditions the concentration of nitrogen oxide ($NO_x$) in the exhaust gas is only about 15 ppm, which is approximately 80% lower than $NO_x$ emissions from a conventional gas fired water heater. Although not necessary, combustion air blower means 7 is preferred to assist in feeding of the fuel/air mixture into the combustion chamber of the burner.

While heat from combustion within heating means 2 will be conducted into the water surrounding said heating means, in order to enhance heating efficiency the flue gas from said heating means is conducted into heat exchanging means 3. Heat exchanging means 3 may be a conventional center flue heat exchanger. Conventionally available center flue heat exchangers may be designed to extract sufficient heat from the flue gas to reduce the temperature of the flue gas from approximately 1800° F. at the entrance of the heat exchanger to about 500° F. at the exit of said chamber. Additional energy is extracted from the flue gas by passing said gas from heat exchanging means 3 to condensing heat exchanging means 4. After exiting condensing heat exchanging means 4 the flue gas temperature is only approximately 20° F.-30° F. above ambient temperature, which corresponds to a thermal efficiency in the 90-95% range. Condensing heat exchanging means 4 may comprise metal tubing which, to improve heat transfer efficiency, may contain internal cooling fins. The design of said condensing heat exchanging means 4 must be such that sufficient heat exchange area is provided to reduce the temperature of the flue gas below its dew point and cause at least some of the moisture in the flue gas to condense. Preferably sufficient heat exchange area may be provided by a helical coil of metal tubing.

The blower means 7 is preferably provided both to mix the fuel and air which is injected into the inlet of said blower from said fuel/air mixer 5 and also to compensate for loss of buoyancy of the flue gas and pressure drop within the system due to the condensation caused by condensing heat exchanger 4. Alternatively, blower means 7 may be placed in the exhaust port of condensing heat exchanging means 4 to provide an induced draft through the system.

As shown in FIG. 1 heating means 2 is generally located within chamber 1 at the upper portion thereof.

The heating means may be top fired or side fired. However, in the embodiment shown in FIG. 1 the heating means 2 should be placed in the upper half of the chamber volume of chamber 1 such that said heating means is in the hot stratified zone. In the zone located below heating means 2, is located the heat exchanging means 3 whereby the flue gas is cooled from approximately 1800° F. to 500° F. In the lowest portion of the chamber 1 is located the condensing heat exchanging means 4 wherein the flue gas temperature is cooled from approximately 500° F. to 20° F.–30° F. above ambient temperature. According to the configuration in FIG. 1 stratified zones of heated water are created in chamber 1 with the hottest zone being at the top of the chamber and the coolest zone being at the bottom of the chamber.

In the operation of the heater shown in FIG. 1 fuel gas and air enter into ports 8 and 9, respectively. After passing through safety shut-off valve 6 the fuel enters fuel/air mixer 5 wherein fuel and air are mixed, conducted into blower means 7 and into heating means 2 located within chamber 1. Flue gas from the combustion in heating means 2 is then subsequently cooled through heat exchanging means 3 and condensing heat exchanging means 4 and out exhaust port 10. Moisture condensing from said flue gas in condensing heating means 4 is drained through a drain pipe 11. During periods of hot water demand, cool water enters through pipe 12 into the bottom portion of chamber 1, thereby contacting condensing heat exchanging means 4. By virtue of the stratified zones of heating within said chamber 1 the water at the highest temperature is located at the top of said chamber 1 and may be taken through pipe 13 on demand.

Referring to FIG. 2 there is shown a second embodiment of a heater according to the present invention. Fuel gas enters through port 20 by safety shut-off valve 15 and into fuel air mixer 14 where it is mixed with air entering through port 21. The fuel/air mixture is then conducted into air moving means 16 and into burner 17 located within the chamber 26 which contains water. Flue gas from combustion within heating means 17 is conducted into heat exchanging means 18 and subsequently to condensing heat exchanging means 19 located on exterior of said chamber 26. Exhaust flue gas exits condensing heat exchanging means 19 through exhaust port 22. The condensation of moisture from the flue gas within condensing heat exchanging means 19 is drained through pipe 23. Water at ambient or cooler temperature enters through pipe 24 to provide the cooling medium for condensing heat exchanger 19. Water warmed from condensing heat exchanging means 19 is then conducted into chamber 26 via pipe 27. Hot water is extracted from chamber 26 through pipe 25 on demand. The heating means 17 is preferably an infrared fiber matrix burner such as that disclosed in U.S. Pat. No. 3,179,156. The heat exchanging means 18 may be a conventional water heat exchanger which is normally designed to extract sufficient heat from the flue gas to reduce its temperature from about 1800° F. to about 500° F. The condensing heat exchanging means 19 must provide sufficient heat exchange area to reduce the temperature of the flue gas below its dew point to cause some moisture in the flue gas to condense. Preferably condensing heat exchanging means 19 may be a finned tube. In the operation of the heater shown in FIG. 2, water at ambient or less than ambient temperature first enters through inlet pipe 24 into condensing heat exchanger 19. Therefore, the flue gas in the condensing heat exchanger 19 is exposed to the coolest water, which thereby improves heat transfer performance and maximizes thermal efficiency of the heater. The water exiting the condensing heat exchanger and entering into the chamber 26 through pipe 27 is still relatively cold and is thus first exposed in the chamber to the hot combustion burner, thereby enhancing the thermal performance of the heater. Hot water within said chamber 26 then rises to the top of the tank and is removed as needed through outlet pipe 25. Maximum thermal efficiency occurs during a hot water demand period when cold water flows through the condensing heat exchanger and the greatest amount of heat is extracted from the flue gas. When hot water is not in demand the burner may be thermostatically operated to only maintain the stored water at the set temperature point. Therefore, since inlet cold water is not flowing through condensing heating means 19 during storage periods, a pump 28 (not shown) may be provided at the bottom of chamber 26 to recirculate the cooler water from the bottom of the tank through the condensing heat exchanger. Pump 28 will operate only during periods of water storage in order to maintain the condensing operation within condensing heat exchanging means 19 and to prevent otherwise stationary water in condensing heat exchanging means 19 from boiling.

Referring to FIG. 3 there is shown a preferred embodiment of a stratified water heater according to the present invention. Fuel gas enters through pipe 29 and by safety shut off valve 30 into combustion air blower 31 where said fuel gas is mixed with air and conducted into burner 32. Burner 32 is preferably an infrared fiber matrix burner. The air fuel mixture is ignited within said burner 32 by ignitor 33, which is preferably a silicon carbide glow plug or other intermittent ignition device. Ignitor 33 is placed very near to the burner surface so that it may be effective both as ignitor and flame detector after ignition. Ignitor 33 and gas safety shut off valve 30 are controlled by conventional electronic module 34 applicable for appliance burners. The temperature of the water to be maintained within the heater is controlled by conventional thermostat 35. The heated flue gas from burner 32 is then conducted into center flue heat exchanger 36 centrally located within storage tank 37. Center flue heat exchanger 36 may contain a baffle 38 to create a turbulence in the flue gas, thereby increasing heat absorption. The flue gas is then conducted from center flue heat exchanger 36 into condensing heat exchanger 39 comprising a coiled helical tube. Exhaust flue gas is then conducted up flue duct 40 through opening 41. The condensate of moisture from the flue gas within the condensing heat exchanger 39 is drained through drain pipe 42. Cold water enters through pipe 43 down to the bottom of storage tank 37 and through dip tube 44 so that the cold water may first be exposed to condensing heat exchanger 39. Hot water may then be extracted on demand through pipe 45. The storage tank is also equipped with conventional anti-corrosion anode 46.

Referring to FIG. 4 there is shown the preferred embodiment of a heater according to the present invention having the condensing heating means located exterior to the water storage chamber. Fuel gas enters inlet pipe 46 by gas shut off valve 47 into combustion air blower 48 where it is mixed with incoming air. The fuel/air mixture is conducted into burner 49, which is preferably an infrared fiber matrix burner. The fuel/air mixture is ignited within said burner by ignitor 50 which is preferably a silicon carbide glow plug or other intermittent ignition device. Ignitor 50 is placed near to the burner surface so that it may be effective both as an ignitor and flame detector after ignition. The ignitor 50 and shut off valve 47 are controlled by conventional electronic module 51 made for appliance burner applications. The temperature of the heated water within tank 52 is controlled by conventional thermostat 53. The flue gas from burner 49 is then conducted upward through center flue heat exchanger 54 which is of the finned tube design. The center flue heat exchanger contains baffle 55 to create turbulence in the flue gas, thereby increasing the heat absorption. The flue gas then exits the center flue heat exchanger and enters condensing heat exchanger 57 via duct 56. Condensing heat exchanger 57 is a finned tube and the flue gas exits through outlet 58. The condensate formed within condensing heat exchanger 57 is drained through drain pipe 59 from condensate collection basin 60. Cold water enters through pipe 61 and flows through condensing heat exchanger 57 and exits through dip tube 62 which exposes the still relatively cold water to the lower portion of the storage tank 52 near the location of the burner 49. Hot water is then withdrawn from tank 52 through water outlet 63. The condensing heat exchanger 57 is located exterior to the storage tank 52 and is separated therefrom by wall barrier 64. During periods of non-demand in order that there be a constant flow of water through the condensing heat exchanger recirculation pump 65 is provided to recirculate water from within the tank through condensing heat exchanger 57.

As described above advantageous performance features of the water heaters according to the present invention are the thermal efficiency and $NO_x$ emissions. Thermal efficiency is in the range of 90-95% which represents a 35% fuel saving over conventional water heaters. This efficiency level is achieved in accordance with the invention by the use of a condensing heat exchanger to maximize heat recovery. The $NO_x$ emission concentration of 15 ppm is significantly lower than the 80-100 ppm of a conventional water heater. Table 1 set forth below summarizes the performance of a water heater constructed in accordance with the present invention. The characteristics of a residential size heater are listed, however, the tank volume, heat input, and recovery rate may be scaled up for commercial applications.

TABLE 1

| WATER HEATER PERFORMANCE | |
|---|---|
| Application | Residential (can be scaled up for commercial application) |
| Tank volume | 40 gallons |
| Heat input | 32,500 Btu/hr |
| Steady state thermal (recovery) efficiency | 90-95 percent |

TABLE 1-continued

| WATER HEATER PERFORMANCE | |
|---|---|
| Recovery rate (100° F. rise) | 36 gal/hr |
| Excess combustion air | 10 percent |
| Burner surface temperature | 1800° F. |
| Flue temperature | 20° F.-30° F. above ambient |
| Sensible heat recovery | 98 percent |
| Latent heat recovery | 65 percent |
| $NO_x$ concentration in flue gas | 15 ppm (air-free basis) |
| $NO_x$ emission factor | 8 ng/JUH |
| CO concentration in flue gas | 20 ppm (air-free basis) |
| Unburned hydrocarbon concentration in flue gas | 2 ppm (air-free basis) |

The above specification and preferred embodiments are presented by way of illustration but are not intended to be limitations to the present invention. From the above specification and preferred embodiments various modifications thereof will be apparent to those of ordinary skill in the art and said modifications are deemed to be included within the scope of the claimed invention.

What is claimed is:

1. A water heater comprising a water storage chamber; combustion heating means comprising an infrared fiber matrix burner positioned in the upper portion of the interior of said chamber; heat exchanging means positioned below said combustion heating means within said chamber accommodating a first conduit for flue gas from said combustion heating means whereby said heat exchanging means provides heat to water in said chamber and lowers the temperature of said flue gas to about 500° F.; condensing heat exchanging means positioned below said heat exchanging means within said chamber accommodating a second conduit for said flue gas, said second conduit communicating with said first conduit, whereby contact of said condensing heat exchanging means with water at substantially ambient or lower than ambient air temperature from a source of water external to said chamber lowers the temperature of said flue gas below the dew point whereby moisture formed as a by-product of combustion condenses in said condensing heat exchanging means; and whereby water entering said chamber at substantially ambient or less than ambient temperature is heated by said combustion heating means, heat exchanging means and condensing heat exchanging means to provide stratified zones of heated water within said chamber, said heater characterized by a steady state thermal recovery efficiency from said combustion heating means and both said heat exchanging means to the water within said chamber in the range of 90-95%, and further characterized by $NO_x$ emission concentration of flue gas exiting said condensing heat exchanging means of less than about 15 ppm.

2. A water heater according to claim 1 which includes blowers means for feeding a mixture of fuel and air into said combustion heating means.

3. A water heater according to claim 1 which includes safety shutoff valve means for controlling the flow of fuel into said combustion heating means.

* * * * *